Feb. 22, 1927.
G. H. BROOKS
1,618,405
AUTOMOBILE BUMPER
Filed June 2, 1926
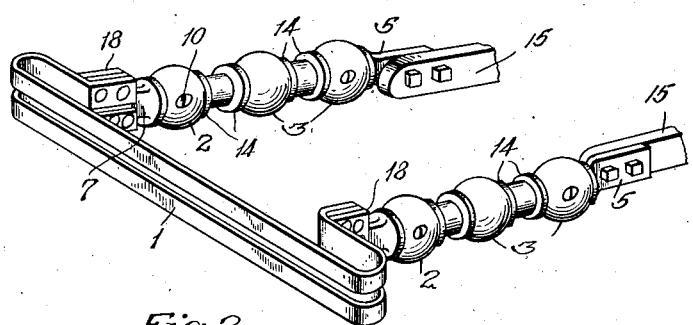
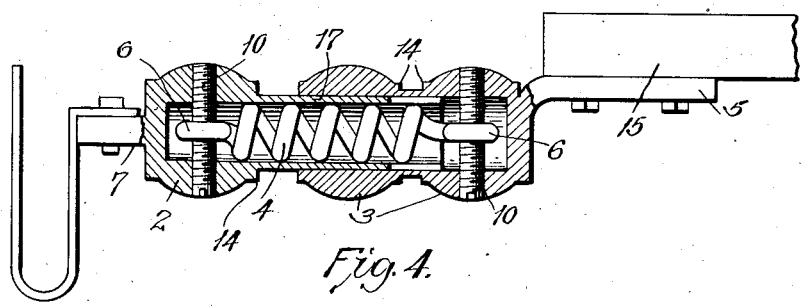
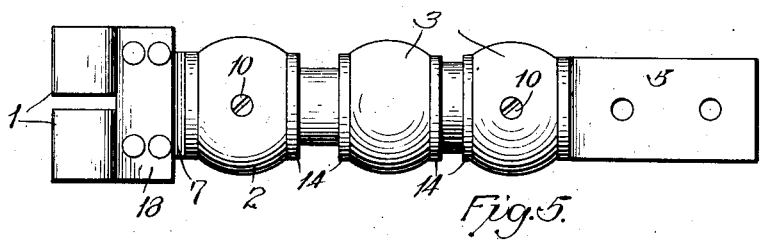
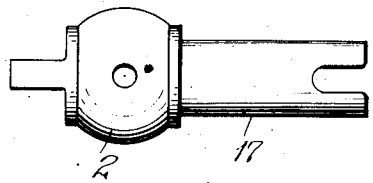
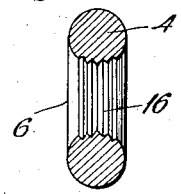
Inventor
George H. Brooks Patented Feb. 22, 1927.

1,618,405

UNITED STATES PATENT OFFICE.

GEORGE H. BROOKS, OF LOUISVILLE, KENTUCKY.

AUTOMOBILE BUMPER.

Application filed June 2, 1926. Serial No. 113,283.

My improvement relates to improvement in automobile bumpers and the objects of my improvement are, 1st to improve the efficiency of the shock absorbing device, 2nd to prevent rattling noise, 3rd to prevent loose connection, 4th to provide a coupling, 5th lessening the number of parts used.

I attain the objects by the mechanism illustrated in the accompanying drawings in which Figure 1 is a view showing the front end of a frame and the manner of attaching the bumper to the automobile frame, also showing the double bar or guard member.

Figure 2 is a view showing the plan of the bumper and the coupling coil spring and manner of attaching a single bar or guard, also of attaching the bumper to the frame of an automobile.

Figure 3 is a view showing a part of the tubular telescopic, member 2, showing the slots in the tube portion, 17, for admitting machine screws or threaded bolts when the bumper is fully compressed, also showing the rectangular end of the tubular member 2 at 7 for attaching a single bar or guard and also for attaching the fastening plate 18, used to attach double bars or guard member 1.

Figure 4 is a side view of the bumper showing the double bar or guard 1 attached to the fastening plate 18, which plate is attached to tubular telescopic member 2 at 7. It will be noticed that at the end of tubular member 3 there is a bracket portion, 5 extending backward which is bent towards and then parallel with the frame of the automobile 15 and holes therein, making it easy to attach.

It will be seen that the two tubular telescopic members 2 and 3, are made in two parts, which are made by casting in molds made from patterns. These patterns are turned on a lathe forming the outward surface circular and a circular collar with a convex band thereon and the end portion formed into a bracket portion on one of the parts, the other is turned up in the same manner having one convex band and a tube portion with slots cut therein and a rectangular end opposite. The convex band portions appear the shape of a door knob or ellipse intersected by a hollow cylinder. The tube portion is made to slide within the cavity of the outside tubular telescopic bracket member a portion of its length and must fit accurately the inside of the cavity. Holes are drilled in the walls of the tubular members and threaded for threaded bolts or machine screws. They are finished, nickel plated and polished.

The bumper bars, 1 are bent the shape of the letter C and the ends terminate at right angles to the bars and have perforations therein for attaching to either the plate member 18 or a single bar to the rectangular end of the tubular member 2.

A double bar or single bar may be used as desired, but the fastening plate 18, must be used when using double bars.

Figure 5 is a view of a portion of the eye-form ends, 6, of the coupling spring. It is threaded internally for machine screws or threaded bolts 10, 10, and is used to prevent turning, rattling and for coupling with the bolts and loose connection and compression as a shock absorber, thus performing a four-fold duty.

The coil coupling spring must be of sufficient strength and thickness to hold securely the two tubular members together and at least ¼ inch thick and about 4 or 5 inches long, made of steel, tempered to withstand shocks.

The coil or coupling spring 4 is made by forming the spiral coils and then bending eye-form ends or circular loops on the ends thereof, and is threaded internally for engaging the thread of the machine screws or threaded bolts 10, 10, as shown in the drawings.

I am aware there are other compression springs in use which act only as compression springs and in use cause a rattling noise, being loose at both ends. My coil coupling spring is not loose and is secured by machine screws or threaded bolts, thus eliminating the rattling and noise complained of and for the purposes set forth.

In the drawings like parts have like reference numbers.

Having thus described my bumper, what I claim is:

1. In an automobile bumper consisting of a bumper bracket comprising two tubular telescopic members, a coil coupling spring within said members, having internally threaded eye-form ends, each eye end held in its respective tubular member by a bolt threaded through both the eye and walls of the member to prevent loose connection and noise and for coupling the tubular members together, said bumper comprising C shaped impact bar members with ends turned at right angles to the bar body, and clamping plates cooperating with said ends to secure the bars to the tubular members.

2. In the combination of an automobile bumper, a bumper bracket comprising two tubular telescopic members, a coil spring within said members, having internally threaded eye-form ends, each eye end held in its respective tubular member by a bolt threaded through both the eye and the walls of the member to prevent loose connection and noise, an attaching plate member, a C shaped impact bar member with ends terminating at right angles to the bar and having perforations therein for securing elements to engage said ends and said attaching plate.

3. The combination of an automobile bumper consisting of two hollow cylindrical members, one having a tube portion with slots cut therein and a short square or flatwise end with holes therein and having a collar with a convex band thereon and threaded perforations through the walls thereof and the tube portion of said member adapted to be inserted within the cavity of the other cylindrical member and the said member terminating in a bracket, a coil spring within said member, having internally threaded eye-form ends, each eye end held in its respective tubular member by a bolt threaded through both the eye and walls of the member to prevent loose connection and noise and for coupling the tubular members together.

4. In an automobile bumper comprising a pair of projecting arms each terminating in a barrel portion having ellipse shaped knobs or convex bands encircling the barrel portion and having threaded perforations through the knobs or convex bands and said tubular members having rectangular ends with holes therein and ellipse shaped knobs or convex bands encircling the tubular portions and threaded perforations therein, each tubular portion inserted in the cavity of a barrel portion and held in place by machine screws passing through the threaded perforations of the ellipse knobs or convex bands and through the eye portions of the coupling spring eyes, a coil spring within said members, having internally threaded eye-form ends, each eye end held in its respective tubular member by a bolt threaded through both the eye and the walls of the member to prevent loose connection and noise and coupling the tubular members together, said bumper comprising C shaped impact bar members with ends turned at right angles to the bar body, and clamping plates cooperating with said ends to secure the bars to the tubular members.

In testimony hereof, I have set my hand and signature this 31st day of March, 1926.

GEORGE H. BROOKS.